2 Sheets--Sheet 1.

J. K. SAX & G. W. KEAR.
Car-Wheels.

No. 142,587. Patented September 9, 1873.

WITNESSES.
S. S. Simonds
John Pollitt

INVENTORS.
John K. Sax
George W. Kear
By W. E. Simonds
Atty

J. K. SAX & G. W. KEAR.
Car-Wheels.

No. 142,587.

Patented September 9, 1873.

WITNESSES.
S. J. Simonds
John Pollitt

INVENTORS.
John K. Sax
George W. Kear
By W. E. Simonds
Atty

UNITED STATES PATENT OFFICE.

JOHN K. SAX, OF PITTSTON, AND GEORGE W. KEAR, OF KINGSTON, PA.

IMPROVEMENT IN CAR-WHEELS.

Specification forming part of Letters Patent No. 142,587, dated September 9, 1873; application filed December 18, 1872.

*To all whom it may concern:*

Be it known that we, JOHN K. SAX, of Pittston, in the county of Luzerne and State of Pennsylvania, and GEORGE W. KEAR, of Kingston, in said county and State, have invented certain new and useful Improvements in Railway-Car Wheels, of which the following is a specification, reference being had to the accompanying drawings, in which—

Figure 1:
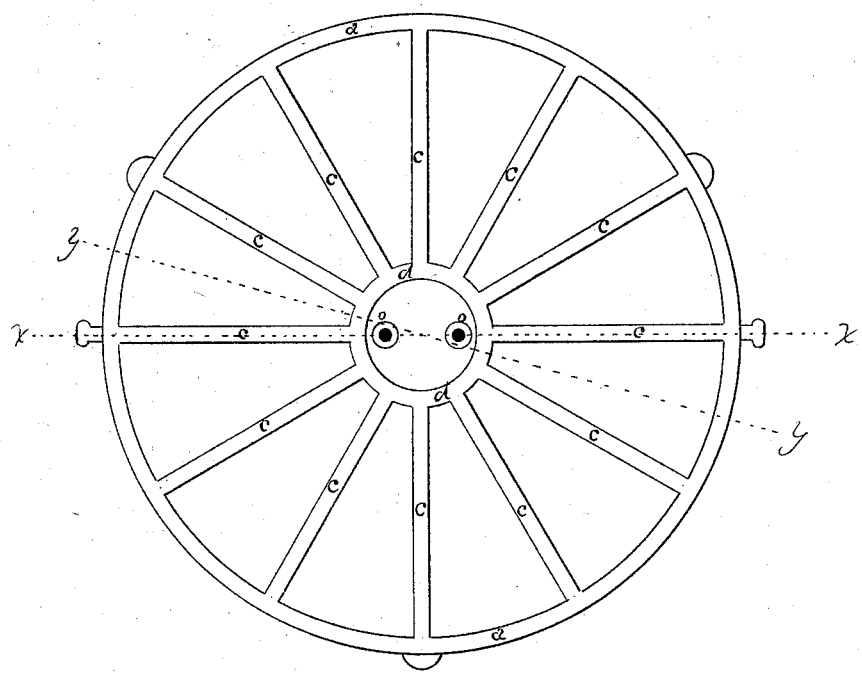
Figure 2:
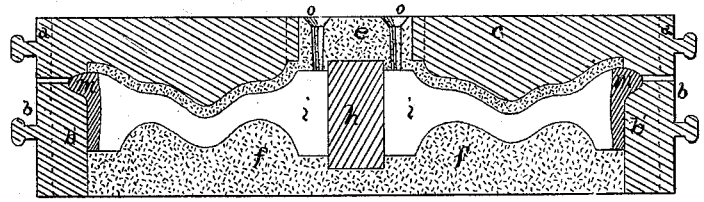
Figure 3:
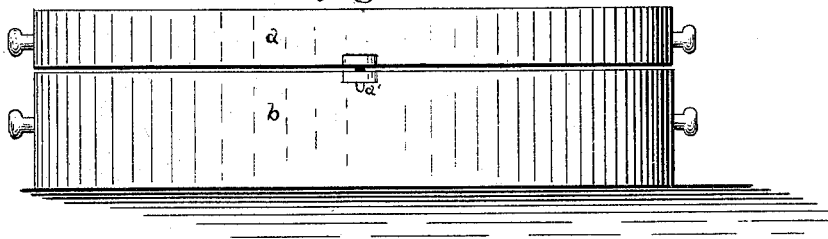
Figure 4:
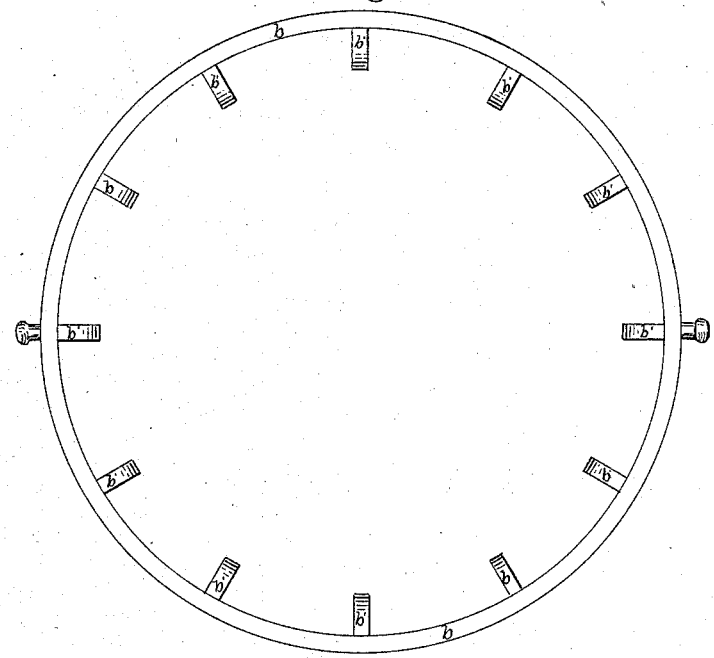
Figure 5:
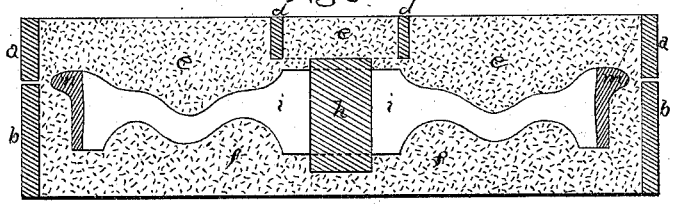

Figure 1 is a top view of a flask for making wheels embodying our improvements. Fig. 2 is a view of the same in central vertical section through the line $x\ x$. Fig. 3 is a side view of the same. Fig. 4 is a top view of the lower part or "drag" of the flask. Fig. 5 is a view of the whole mold in central vertical section through the line $y\ y$.

Letters Patent for an improvement in such wheels were granted to us April 6, 1869, which were reissued and dated May 3, 1870, the invention described therein being (speaking in general terms) a car-wheel having a cast-iron body and a steel tread or tire, the body being welded to the tire in the mold—the tire being first heated to a proper degree, then placed in the mold, and then the molten iron poured in to form the body of the wheel, the body and tire coming out perfectly welded together. The steel tire therein referred to is a hammered or rolled tire.

The present invention is an improvement upon or modification of the one described in said former Letters Patent, and consists in uniting a cast-steel tire to a body of cast-iron in the same way, thereby producing a cheaper article, which will serve a useful purpose.

The letter $a$ indicates the cap or upper part of the flask, fitting to and setting upon the drag or lower part $b$, and held in position by dowel-pins $a'$ in the common way. The cap has radial arms $c$ extending from the outer rim to the central ring $d$, the lower edges of which conform to the contour of the upper side of the wheel, but not touching it. The letter $e$ indicates the sand in the cap, and $f$ the sand in the drag; $h$, the core, which forms the hub; and $i$, the open space to be filled with molten iron. The letter $m$ indicates the tire, which is made cast to pattern, and which must be heated to a proper degree—that is, about a welding-heat—either before putting it into the mold or while in the mold. It is supported upon the wings $b'$ projecting at regular intervals from the drag.

The metal is then poured to form the body, and the tire and body will weld together in the mold.

It should be understood that this tire is made of steel cast into shape, in distinction from a hammered or rolled tire; and this invention is only claimed as a modification of or improvement upon the invention described and claimed in our said former Letters Patent.

The letters $o$ indicate sprue-holes for pouring the metal, which may be either at or near the center of the mold, as shown, or so placed as to conduct the metal into the mold at or near the inner side of the tire, such sprues in the latter case being united on the top of the mold by channel-ways leading to a central pouring-basin.

We are aware that cast-steel tires have been welded to car-wheels having cast-iron bodies by pouring both metals into the same mold at the same time, the two metals being kept apart by a circumferential band of wrought-iron or the like placed in the mold, such band remaining in the mold and serving as a medium to unite the cast-steel and the cast-iron; but this we do not claim, as it is an essential feature of our present invention that the molten cast-iron flows directly against the surface of the cast-steel tire, thus dispensing with any intervening medium, such as a wrought-iron band.

We claim as our invention—

A car-wheel having a cast-iron body welded directly, and without any intervening band of wrought-iron or the like, to a cast-steel tire, substantially as described.

JOHN K. SAX.
GEORGE W. KEAR.

Witnesses:
WM. E. SIMONDS,
R. B. BROCKWAY.